US011607971B2

(12) United States Patent
Wang et al.

(10) Patent No.: US 11,607,971 B2
(45) Date of Patent: Mar. 21, 2023

(54) METHOD FOR SCHEDULING MULTI AGENT AND UNMANNED ELECTRIC VEHICLE BATTERY SWAP BASED ON INTERNET OF VEHICLES

(71) Applicant: HARBIN ENGINEERING UNIVERSITY, Heilongjiang (CN)

(72) Inventors: Tong Wang, Heilongjiang (CN); Guangxin Yang, Heilongjiang (CN); Yu Wang, Heilongjiang (CN); Shan Gao, Heilongjiang (CN); Liwei Chen, Heilongjiang (CN)

(73) Assignee: Harbin Engineering University, Heilongjiang (CN)

( * ) Notice: Subject to any disclaimer, the term of this patent is extended or adjusted under 35 U.S.C. 154(b) by 321 days.

(21) Appl. No.: 17/156,535

(22) Filed: Jan. 23, 2021

(65) Prior Publication Data

US 2022/0126725 A1    Apr. 28, 2022

(51) Int. Cl.
| | |
|---|---|
| *B60L 53/80* | (2019.01) |
| *H04W 4/44* | (2018.01) |
| *B60L 53/67* | (2019.01) |
| *B60L 53/66* | (2019.01) |
| *B60L 53/63* | (2019.01) |

(52) U.S. Cl.
CPC ............... *B60L 53/80* (2019.02); *B60L 53/63* (2019.02); *B60L 53/66* (2019.02); *B60L 53/67* (2019.02); *H04W 4/44* (2018.02)

(58) Field of Classification Search
CPC ........................................................ B60L 53/80
USPC ........................................................ 320/109
See application file for complete search history.

(56) References Cited

U.S. PATENT DOCUMENTS

| | | | |
|---|---|---|---|
| 2011/0202476 A1* | 8/2011 | Nagy ..................... | B60L 53/63 320/109 |
| 2018/0068562 A1* | 3/2018 | Ho .......................... | G08G 1/04 |
| 2019/0335444 A1* | 10/2019 | Yang ..................... | H04W 72/51 |
| 2020/0198494 A1* | 6/2020 | Chen ..................... | B60L 53/66 |
| 2021/0129697 A1* | 5/2021 | Cho ....................... | B60L 53/57 |
| 2022/0046391 A1* | 2/2022 | Ong ....................... | H04W 4/60 |

* cited by examiner

*Primary Examiner* — Jerry D Robbins
(74) *Attorney, Agent, or Firm* — Hammer & Associates, P.C.

(57) ABSTRACT

A method for scheduling EV battery swap based on IoV, in which the roadside units regard battery-swap station clusters with a high degree of potential cooperation as a whole, and gather them into a single battery swap area; taking a service rate of a cluster of swap stations as an assessment target, and mainly examining a service capability, a service quality, and location information of each of swap station nodes themselves, and a current state of those electric vehicles that require to swap battery; providing a solution of the best joint actions for the overall electric vehicles to maintain the overall service balance of every swap station and improve a long-term performance of Internet of Vehicles. According to the invention, a battery of the electric vehicles can be swapped as soon as possible, and every battery swap station can maintain business balance.

10 Claims, 3 Drawing Sheets

METHOD FOR SCHEDULING MULTI AGENT AND UNMANNED ELECTRIC VEHICLE BATTERY SWAP BASED ON INTERNET OF VEHICLES

FIELD OF THE INVENTION

The present invention relates to a method for scheduling multi agent and unmanned electric vehicle battery swap based on an Internet of Vehicles, and belongs to the technical field of scheduling electric vehicle battery swap.

PRIOR ART

A communication between vehicles and roadside units (Vehicle to Roadside Unit, V2R) is maintained, so that the Internet of Vehicles can obtain road traffic information in real time, reduce network delay and improve network transmission capacity. In addition, MEC (Multi-access Edge Computing) provides efficient computing functions and improves an IT service environment at edge of the network. This environment has ultra-low delay and high bandwidth, which can realize real-time access to wireless network information.

In particular, by deploying the Roadside Units (RSU), a computing load of an intelligent transportation system is transferred to an Edge Computing Node (ECN) through a distributed computing strategy, so as to complete most of calculations. Moreover, through VANET, 4G or 5G and other communication methods, the results are sent to vehicles equipped with on-board unit (OBU) in order to satisfy the needs of vehicle-infrastructure coordination. The roadside units connected through an optical fiber network act as relay nodes to exchange information with mobile clients of electric vehicles. Information sharing is maintained among relay agents, so that when a mobile client leaves a communication radius of one relay node, it searches for another relay node so as to continue information transmission task.

Based on the above facts, in the scenes of large-scale, high-dynamic, and unmanned electric vehicle swapping decisions, between a battery supplying side and a battery demanding side, there is generated a problem during a coordinated optimization of battery swap, mainly including: 1) There is a contradiction between a high service occupation rate pursued by battery-swap stations (i.e. long waiting queues) and a self-benefit maximization pursued by electric vehicles (i.e. short distance to go there and less queuing time), therefore, it is difficult to model, optimize, and ensure its convergence by the "heuristic" methods in the prior art; and 2) There is also a competitive relationship among multiple adjacent swap stations, so that in the practice of electric vehicle battery swap scheduling, some swap stations are often overcrowding, while the others are idle. Therefore, an "optimal" swapping decision for a certain electric vehicle is far from being optimal for the entire Internet of Vehicles. This problem has long been ignored in the industry.

In the operation of electric vehicles, it needs to consider when to swap batteries and where to swap batteries. If a predetermined time for swapping battery is disorderly and a preset location for swapping battery is random, when a large number of electric vehicles drive to the same swap station to try to swap batteries at the same time, there may be a lot of swap stations which have nothing to do. If a battery reserve of swap stations is too much, it will increase an operating cost of swap stations, causing one vicious problem after another between a server side and a user side, which is not conducive to a sustainable development of swapping related industries. On the contrary, if the battery reserve of swap stations is insufficient, users need to wait for service in line, which greatly increases a duration of swapping battery.

In view of the above considerations, in the prior art, a large number of research work have been conducted on electric vehicle battery swap scheduling strategies.

However, those researches in the prior art focus on: when multiple battery-swap stations can provide a swap service for a certain user, how to provide the user with an optimal solution so as to reduce a waiting time for battery swap in the future: when a user cannot be provided with the swapping service immediately, how to provide the user with a shortest-waiting-time swap proposal and when the swapping resource is fully utilized, how to balance the phenomenon of idleness and overload so as to effectively improve the utilization efficiency of swap stations.

In particular, the existing researches on selecting swap stations have only considered the coordinated scheduling strategy between those moving electric vehicles and swap stations, but have not considered the following problems: when a demand for battery swap increases to a certain threshold, due to insufficient battery reserves at the swap stations and a single swap station accepts too much battery-swapping orders, it may cause problems, such as long waiting time for swapping battery; promoting coordination and cooperation between swap stations by reasonably and effectively centralized allocation of battery resources; balancing the competitive relationship between swap stations, and reasonably allocating battery swap resources.

In particular, in the prior art, the methods for selecting battery-swap stations are all optimized methods based on individual parameters, for example, how to find the nearest swap station, how to reach an object swap station as soon as possible, how to get the battery swap as quickly as possible, and how to shorten the waiting time, etc. In the prior art, there is usually only one parameter optimization object, only a specific electric vehicle is limited to consider in the optimization, only a current technical effect of the system is noticed while a long-term technical effect of the system is ignored, only a micro benefits of a certain electric vehicle are noticed while a macro benefits of the entire electric vehicles running in a city are ignored, and only a local benefits of a certain area are noticed while an overall benefits of an urban transportation network are ignored. Therefore, the effectiveness of the traditional Internet of Vehicles is often not high, and the robustness is also poor, not mention to have an ability to self-learn and self-improve the accuracy and reliability of decision-making.

In fact, in the electric vehicle industry, due to the inherent manner of traditional thinking, no one has ever realized that for the battery-swap station selection method, there is a better technical solution than that pursuing the individual parameter goal, and no one has tried a battery-swap station optimized selection method that is different from that based on any unique parameter.

On the contrary, in the prior art, only one of the following, parameters has been considered, including: a shortest distance between a target swap station and a certain electric vehicle, a shortest time for a certain electric vehicle to reach the target swap station, a shortest operation time at the swap station, and the lowest waiting time for receiving a battery swapping service. In particular, in this technical field, no technical solution aiming at directly optimizing a service rate of a cluster of battery-swap stations has been retrieved so far, not mention to have any system that can realize autonomous learning, self-improvement, and continuous improvement of decision-making accuracy and reliability.

SUMMARY OF THE INVENTION

The object of the present invention is to provide a method for scheduling unmanned electric vehicle battery swap based on the Internet of Vehicles, which can enable electric vehicles to be charged as soon as possible, and can balance the business of each of swap stations to make them neither too busy nor too idle.

Another object of the present invention is to provide a method for scheduling electric vehicle battery swap based on the Internet of Vehicles, which overcomes a bias in the prior art, breaks through the traditional thinking philosophy, and does not aim at pursuing a certain technical parameter merit, but directly aim at pursuing the overall technical effect.

Another object of the present invention is to provide a method for scheduling electric vehicle battery swap based on the Internet of Vehicles, which not only pays attention to the current technical effects of the system, but also pays attention to the long-term technical effects of the system, not only pays attention to the benefits of individual electric vehicles, but also pays attention to the overall benefits of entire electric vehicle community, and not only pays attention to the interests of individual swap stations, but also pays attention to the overall interests of swap stations layout in a city.

Thus, according to the present invention, there is provided a method for scheduling unmanned electric vehicle battery swap based on the Internet of Vehicles, characterized in that:

edge information transceiver devices and information processing devices are deployed on the roadside units (RSU), a cloud processing load of an intelligent transportation system is distributed to edge processing nodes, and vehicle infrastructure cooperative communication is carried out by using Uu interface or PC5 interface and through the VANET, 4G or 5G; each roadside unit connected through an optical fiber network acts as a relay node to exchange information with mobile clients of electric vehicles; information sharing is maintained among relay agents; when a mobile client leaves a communication radius of one relay node, it searches for another relay node to continue information transmission task;

a vehicle-infrastructure collaborative service is deployed on a MEC platform; the RSU and an on-board unit (OBU) use their own MCUs to make battery swap decisions and information processing, respectively, and communicate through a signal transceiver device processed with respect to the DSRC protocol;

according to a map surrounding the electric vehicles that require battery swap services, the roadside units combine the battery-swap stations with a high degree of potential cooperation as a Whole, gather them into a single battery swap area, and obtain a probability distribution of every swap area's service capacity, so that the swap area with the highest service capacity probability can be introduced to multiple electric vehicles with swap service requirement at the same time;

taking a service rate of a cluster of swap stations as an assessment target, and mainly examining a service capability, a service quality, location information of each of swap station nodes themselves, and a current state of those electric vehicles that require to swap battery; and providing a solution of the best joint actions for the overall electric vehicles, so as to maintain an overall service balance of every swap station and improve a long-term performance of the Internet of Vehicles.

Preferably, the electric vehicles with the same position change at the same time are processed as the same agent so as to reduce a number of dimensions.

Preferably, implementing the Reinforcement Learning (RI) and continuously updating a probability distribution information of the electric vehicles which needs the expected service.

Preferably, the roadside units divide the electric vehicles into different battery-swap areas dynamically.

Preferably, the division of the battery-swap areas is dynamically adjusted according to a cooperation fit of the swap areas, a current service state, and a strategic allocation difference among the battery-swap areas.

Preferably, every time the battery-swap areas are divided into different clusters, a long-term reward of the decision needs to be predicted, and an after-the-fact evaluation of each time for executing the EVs' actual action is made.

Preferably, it does not pay attention to each individual swap station, but cares about the deviation of a service rate and service quality of the swap areas as a whole from an ideal service rate and service quality; the service rate of each cluster of swap stations is obtained by a feedback information, and it is used as a basic parameter to re-divide the swap areas.

Preferably, according to a parameter amplitude, a parameter change rate, and a current service capacity of each swap area in the scene; and/or, according to the current state and a long-term reward, the roadside units select a suitable battery swap area for a concerned EV; and the result of the battery swap service is fed back to the roadside units.

Preferably, during dividing the battery-swap areas, only those swap stations that are close to each other and close to the concerned EV are selected, and the multiple swap stations are synchronously re-split and reorganized according to a decision matrix.

Preferably, the roadside units are provided with a quantitative reward means for self-evaluating their decision accuracy; after the swap areas are divided into different groups, or after any EV is changed its battery at a swap station, an actual status is fed back to the roadside units, and a difference from its ideal expectation is obtained; if the difference is small, it indicates that the decision making is accurate, and the same decision is made as an experience in the future, thereby recording the highest reward value; if the difference is large, it indicates that the decision making is inaccurate, and the same decision is not made in the future, thereby recording the lowest reward value; a set of big data comprising the reward values is used as a part of the roadside units' reinforcement learning results, so as to provide a basis for making subsequent decisions on the same or similar events.

Based on a battery swap scheduling algorithm of the present invention, according to a target set by the reward function, the present invention can self-learn which swap station is suitable for an EV to choose to swap its battery. After a period of learning and training, an optimal configuration is reached. According to general learning methods, such as deep learning, after learning and training a model, the system is put into use and cannot continue to be adjusted during the use process. According to the multi-agent reinforcement learning method of the present invention, the system model can continue to learn more during the use process, so as to be optimized, improved, and adjusted during its use.

According to the present invention, for the first time, the reinforcement learning is adopted to implement in the decision-making method for performing the battery swap of electric vehicles connected to the Internet of Vehicles. Moreover, the invention adopts a new type of the reinforcement learning based on a delayed backtracking, which is an improvement of an artificial intelligence reinforcement learning technology.

According to the present invention, the RSU (Roadside Unit) may not be used to divide areas, and the RSU is mainly used for delivery of service requests and decision-making information for realizing a vehicle-infrastructure collaborative. According to the present invention, when the number of EVs for battery swapping is very large, and the impact of the scale of the EVs for swapping their battery on the scheduling decision is weakened; those EVs in a certain period of time in the same area are regarded as a set, or as the same agent, which greatly reduces a number of the dimensions.

According to the present invention, a vehicle-infrastructure collaborative service is deployed on a MEC platform, which realizes a vehicle-infrastructure collaborative interaction based on a mobile edge computing technology, reduces the end-to-end data transmission delay, relieves the computing and storage pressure of the terminal or roadside units, reduces the network load caused by massive data backhaul, and provides high-quality services with local characteristics, thus providing a basis for complex calculations.

According to the present invention, the system's own reinforcement learning is realized. Through the interactive learning between agents and environment, the optimization target is transformed from the parameter attribute of traditional methods to the direct optimization of the service rate of clusters of swap stations, thereby greatly improving the effectiveness and robustness of the system unexpectedly.

According to the present invention, a multi-agent optimization algorithm is used; by means of a strategy to eliminate variables, all electric vehicles in the system that require battery swap can obtain the best joint actions; at the same time, through reinforcement learning, the agents can learn independently based on its own experience, no pre-knowledge is required, and no external help is required.

According to the present invention, in the field of electric vehicle battery swap services, a V2R service is deployed on the MEC platform for the first time, in this way, an optimization is realized both in view of the swap stations and in view of vehicles. In terms of the swap stations, more attention is paid to their service rate, while electric vehicles pay more attention to their enjoyed service quality (waiting time), as a result, with at least the two optimization goals, a multi-objective optimization is achieved.

According to the present invention, a "dynamic division" method is adopted, which redefines the state space by updating the battery-swap station judgment matrix, so as to split and reorganize each battery swap area with suitable distance, effectively model and design a multi-objective optimization equation for those time-varying complex dynamic systems which are high-dimensional, dynamic, stochastic, and nonlinear under the conditions of real-time changing multiple electric vehicles and multi-factor mutual constraints, and ensure a convergence of the optimization equation.

According to the present invention, in an experience accumulation and learning of "determining where to go", mainly adopting a "reward function", a quantitative measure for self-evaluating decision-making accuracy; moreover, a generation process of the "reward function" and the "dynamic division" of the "determining where to go" cooperate with each other.

The difference in an inventive concept determines a difference in technical solutions, and also brings with unexpected technical effects.

According to the present invention, by using a multi-agent optimization algorithm, a set of optimal joint actions for all the agents with battery swap requirement is obtained through maximizing the system reward function and eliminating the coordination relationship; in addition to fully considering the real-time status of users and swap stations, the battery-swap scheduling decision based on reinforcement learning also strengthens the strategy more and more, reduces the average waiting time for battery swap, improves the driving experience of battery-swap electric vehicles, and improves the utilization rate of swap stations during continuous learning.

In particular, the present invention overcomes the prejudice of traditional technology, breaks through the traditional thinking stereotype, gets rid of those traditional technical solutions that only pursue a single technical parameter for the swap station selection, opens up a latest technical route with the goal of directly optimizing swap station service rates, and achieves unexpected technical effects, such as autonomous learning, self-improvement, and continuous improvement of decision-making accuracy and reliability.

DESCRIPTION OF THE ACCOMPANYING DRAWINGS

BEST MODE FOR CARRYING OUT THE INVENTION

Figure 2:
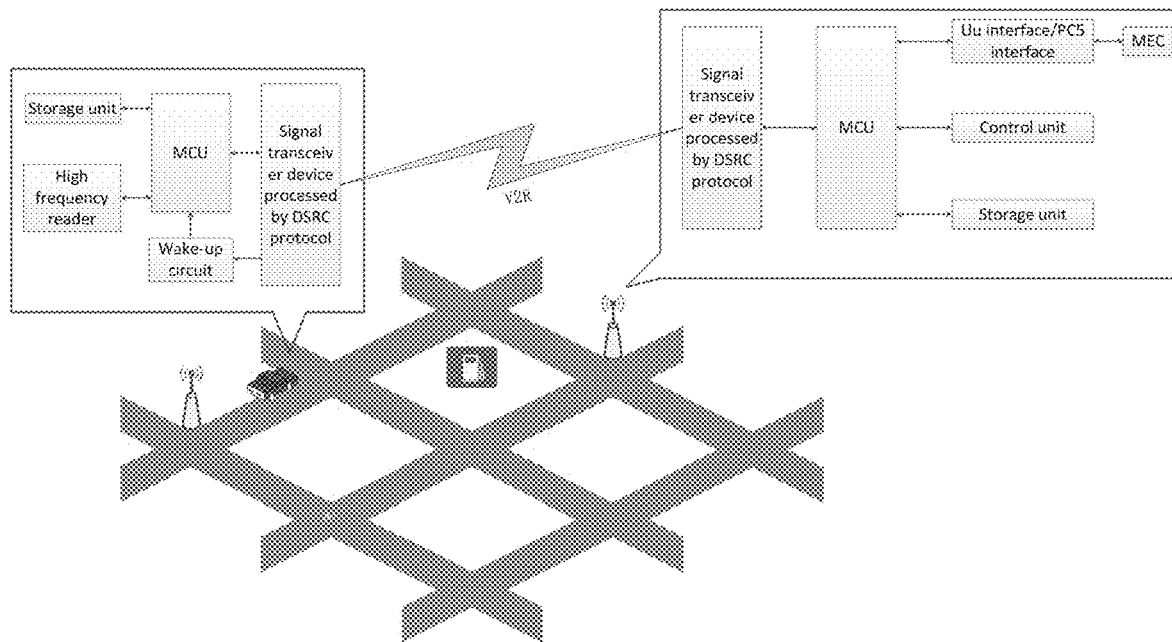
FIG. 2 is a schematic view of the communication model between the roadside units and the vehicles.

Overview of a Vehicle-Infrastructure Collaborative Interaction Based on a Mobile Edge Computing Technology As shown in FIG. 2, a mobile edge computing vehicle-infrastructure collaborative decision-making system for choosing a battery-swap station according to the present invention is carried on an urban road model, including a basic structure of RSU and the on-board units, both of which use their respective signal transceiver devices processed under the DSRC protocol to communicate via V2R. Each of roadside units senses a certain range, the MCU of the roadside units sends out a communication permission through the signal transceiver devices, and after receiving the signals, the on-board units generate interrupt signals so as to wake up the MCU on on-board units, and transfer the information to the roadside units so as to complete communication.

Figure 3:
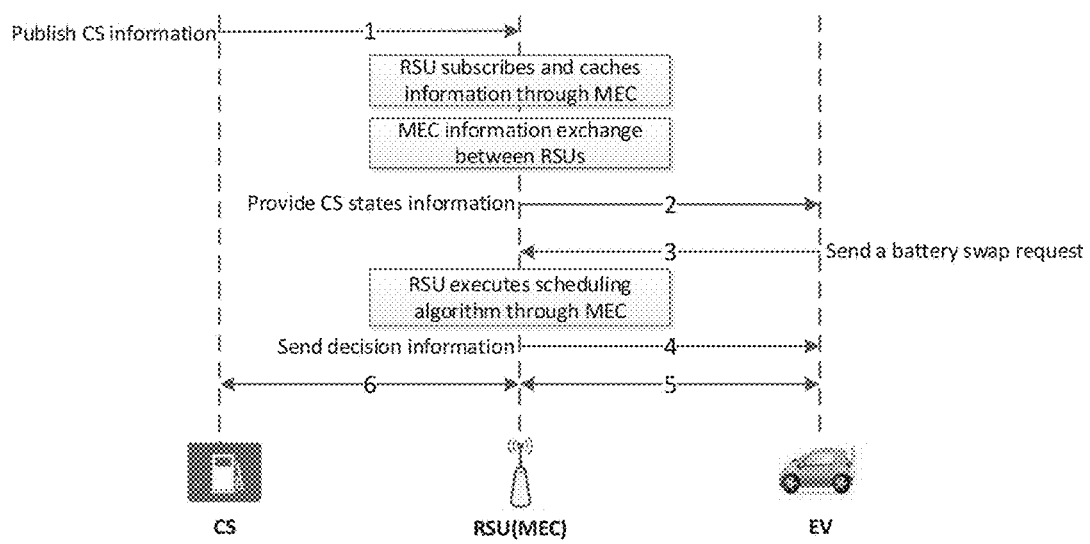
FIG. 3 is a schematic view of the communication model between the electric vehicles and the swap stations in the Internet of Vehicles according to the present invention.

As shown in FIG. 3, in the decision-making system for choosing an electric-vehicle swap station in the Internet of Vehicles according to the present invention, a computing center is moved to the MEC (mobile edge computing) nodes, to directly obtain and analyze data by the MCU of roadside units, to establish a communication computing architecture that does not completely depend on the cellular network and less affects the normal business of the cellular network, and to use its computing and storage capabilities to truly realize the calculation localization for battery-swap scheduling. The execution process includes:

Step 1: in each release cycle T, each CS (charge station, or its equivalent swap station) node releases local information including its own service capabilities (such as the number of available batteries, queue information, etc.), its own service quality (such as average waiting time, average queue length), and location, etc. Putting MEC on the RSU (Roadside Unit), so that the RSU acts as a relay node to be an agent of all electric vehicles in an area to subscribe to the related information, and the RSU caches local information from the CS to assist in sensing EV (Electric Vehicle) battery swap requirements.

Step 2: Through vehicle-infrastructure coordination, the MEC provides all the information of the CS status to the vehicles that have battery swap requirements. When any EV has a battery swap requirement, the EV immediately releases a battery swap request information to the MEC according to its own states (battery status, location information, etc.); and the RSU also acts as a relay node agent to assist the CS to subscribe to the battery swap request information from all EVs.

Step 3: After the RSU with computing capabilities fully subscribes to and aggregates the status information from the CS and the request information from the EV, the MEC makes a decision on the request; after receiving the EV message, the MEC server integrates the local information and the CS information into a status and input them into a multi-agent deep reinforcement learning swap scheduling algorithm so as to complete the formulation of scheduling strategies for the CS and the EV. The RSU generates decision-making information by sensing the network location of the vehicles and sends it to EVs that require battery swap services.

Step 4: According to the received decision information, the EV executes the decision and goes to the designated CS to exchange its battery, and sends an approach request on its way to the CS; after arrival, if the EV successfully exchanges its battery, it uploads the time information to the CS; if EV fails to exchange its battery, then it re-sends the swap request and transmit information about its reward database and swap station to all MECs.

Step 5: The CS receives the electric vehicle reservation information from the RSU, and updates the environment status, then repeats the step 1.

Figure 4:
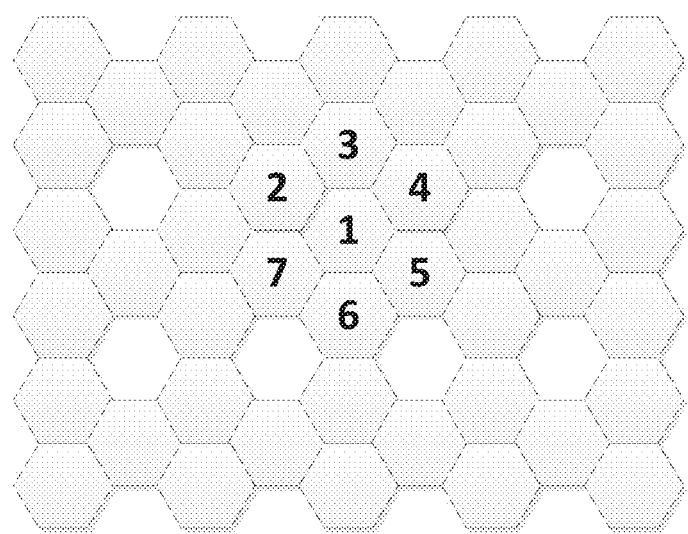
FIG. 4 is a schematic view of the division and selection of the battery swap areas.

Overview of an Intelligent Scheduling Strategy for Selecting a Battery-Swap Station As shown in FIG. 4, by dividing a map into several areas, a service capacity of each battery swap area is analyzed, mapping the service capacity to a probability distribution of executing actions, and continuously updating the probability distribution proportion through a multi-agent optimization algorithm and the reinforcement learning, and selecting an action with the greatest probability. In order to achieve the above goals, the present invention proposes a dual-layer battery swap strategy model that can be dynamically partitioned and be oriented to agents.

Firstly, it is a strategy for dividing the battery swap areas. In order to make full use of the battery swap resources, the present invention divides the current map into a number of battery swap areas so as to jointly receive the battery swap requests from electric vehicles; the service capacity of these areas mainly depends on a sum of the swap capacity of each battery-swap station in the areas; and through the relevant methods of reinforcement learning, for those battery swap stations, according to a cooperation fit, a current service status of the swap areas, and a strategy allocation difference between the swap areas, the division strategy of the swap areas is dynamically adjusted, and the system feeds the division strategy back to the second layer of the model.

Secondly, it is a strategy for selecting an electric vehicle swap station. The so called dual-layer model includes a communication model and a multi-agent battery swap scheduling model, in which a multi-agent optimization algorithm is introduced in the reinforcement learning so as to plan for all the vehicles with battery swap requirements. The reinforcement learning system formulates a greedy scheduling strategy according to a value function, obtains a service rate of each cluster of swap stations through feedback, and feeds this as a parameter back to the swap area division strategy so as to implement the swap area division.

The initialization of the battery swap area division is based on a geographical equalization. In order to strengthen an internal connection (competition and cooperation relationship) between the battery-swap stations, a competition and cooperation relationship is quantitatively input into an improved reinforcement learning algorithm, training and improving a regional division model in the past, present and even future time segments, regarding a cluster of the battery-swap stations with a high potential cooperation as a whole (i.e. as an entirety), and gathering them into a unique battery swap area, so as to jointly receive service requests and improve the service rate and utilization rate of battery-swap stations.

The strategic system makes a battery swap selection strategy and a battery swap area division strategy for the vehicles and the battery swap areas under the scene, respectively, in which the battery-swap station selection strategy takes a certain quantitative plan so as to make an optimal decision according to multiple factors such as a parameter amplitude, a parameter change rate in the system environment, and a current service capacity of the swap areas obtained from the above-mentioned swap area division model. At the same time, the useful information contained in the decision is fed back to the area division model.

Strategic System Model Establishment

This strategy is a two-layer battery swap strategy that includes a selection of one from those battery swap stations and a division of battery swap areas, in which the battery swap of each electric vehicle affects the battery swap capacity of each area in the city and the optimal battery swap area division in real time. The system status includes the status of the battery swap areas and the status of the electric vehicles. And the status of the battery swap areas includes a collection of multiple swap stations in a battery swap scene and several battery swap areas in this scene, in which each battery swap area includes several battery-swap stations. In addition, it also includes a current queue length of the swap areas, a load situation of the swap stations in the current cycle, and the area division parameters. The status of the electric vehicles includes a total number of the EVs, a demand for battery swap, and a current position of the electric vehicles. The strategic system model is as follows.

(1) Strategy for Selecting Battery Swap Station

The system adopts a battery swap station selection strategy based on a multi-agent reinforcement learning, which treats those electric vehicles with the same battery swap demand in the same area as a same agent, and continuously updates the probability distribution of actions through the reinforcement learning, to complete unmanned electric vehicles battery swap station selection. The battery swap station selection strategy model is as follows:

1) Action Space Design

The action space of the system includes actions of each agent from a current area to a destination area at a certain moment.

2) State Transition Function Design

When selecting a battery-swap station, the actions are executed in the current state; according to the current load situation of the swap stations, the system transfers to the next state with a certain probability, which is a state transfer function. And because each battery swap area is similar to a set or cluster of battery-swap stations that can all provide the same services, the transition by probability of the state is less affected by queuing, etc., and the division of areas also improves the efficiency of the reinforcement learning.

3) Strategy for Selecting Battery Swap Area Based on Multi-Agent Reinforcement Learning Algorithm The service rate rewards the system, in which in the scheduling system, it is assumed that each action comprises two appropriate actions, i.e. the first action and the second action, from the action space in combination with the current state, the first action is more conducive to the improvement of the utilization rate of battery swap stations, and the second action is more conducive to the improvement of their service rate, as a result, after this action is executed, an electric vehicle would go to the two possible battery swap areas to complete the battery swap. As shown in FIG. 4, when any electric vehicle is driving in the battery swap area 1, then the selectable battery swap areas according to a distance are swap areas 2, 3, 4, 5, 6, and 7. According to the current state and the reward function, the system suggests the electric vehicle a strategy, which includes two dark battery swap areas 2, 3, the electric vehicle will randomly select one of the two battery swap areas to exchange the battery according to a transition probability, and then the system gets different rewards.

Allocating its transition probability is made according to a proportion of probability transition.

The system plans for the overall vehicles, so any battery-swap decision of each agent will affect other vehicles, and the strategy of each agent cannot be regarded as an independent individual. Every agent selects an action and feeds back a reward value to the system, this strategy maximizes a system reward function through a multi-agent optimization algorithm so as to obtain an optimal joint actions for all vehicles with battery swap requirements, that is, the system reward value is decomposed into a linear sum of a limited number of local reward values, and while considering a coordination relationship of every agent, the corresponding actions of each agent are also planned one after another, and the best joint actions are finally obtained.

All electric vehicles obtain the next update function of a system value function with a certain probability in a process of an independent reinforcement learning. In this way, if the service rate of the current battery swap area is much lower than the expected best service rate, then when the system selects this battery swap area for electric vehicles, a big reward will be given to the system, at the same time, the magnitude of this reward would be adjusted so as to get bigger rewards.

(2) Strategy for Dividing the Battery Swap Areas

The system adopts a battery-swap area division strategy based on the reinforcement learning, which redefines the state space by updating the battery-swap station judgment matrix, so as to split and reorganize every batter swap area with suitable distance, effectively models and designs a multi-objective optimization equation for those time-varying complex dynamic systems which are high-dimensional, dynamic, stochastic, and nonlinear under the conditions of real-time changing multiple electric vehicles and multi-factor mutual constraints, and ensures the convergence of the optimization equation. The division strategy model of the battery swap areas is as follows:

1) Action Space Design

Each battery swap request from an electric vehicle has a relatively small direct impact on the overall division of the battery swap areas sometimes, while the load situation and queue information of the swap stations will have a greater impact thereon; according to the load situation, the queue information and the related strategies, the battery swap system will execute actions, so they are active together to form the action space of the battery swap areas division strategy. At the same time, the vehicle scheduling system will also select a suitable battery swap area for each of the electric vehicles to exchange their batteries according to the current states and long-term rewards.

2) State Transition Function Design

Similarly, in a scheduling system based on area division, the change direction of the current state is also determined by the area division strategy executed in the current state, From the perspective view of long-term rewards, such division is not absolutely the best strategy, so that for every execution of a division action, it also needs to predict its long-term reward, so as to obtain an evaluation of each action execution.

When dividing the battery swap areas, the dynamic factors considered in the present invention include the service rate and the service quality; compared with only paying attention to the quality of each battery swap area division, it is more concerned about the deviation between the current service rate and the service quality of the battery swap areas and the ideal service rate and the service quality of the battery swap areas.

When estimating in advance the long-term reward of the system, after an action is taken in the current state, the system will still change the system status deterministically according to the current action, however, when estimating each iteration after the current status, despite the system gives an action, the system state (including the area division strategy and the selection of the battery swap areas for electric vehicles) will have a certain probability to transfer to a state that is conducive to a service quality, and there will be another probability to transfer to a state that is conducive to a utilization rate of the swap stations at the same time. Meanwhile, no matter of the service quality or the utilization rate of swap stations, the improvement thereof leads to correspondingly reduce the waiting time for battery swap of the electric vehicles, with a reduction more or less, so that the system can continuously optimize the waiting time for battery swaps in an orderly chain structure, while improving the service quality and the utilization rate of the battery swap stations.

3) Design of Reward Equation

A reward function for the division of battery swap areas is also designed through the service quality and the service utilization rate. Since the state transfer of the battery swap areas considers both the service utilization rate and the service quality of battery swap areas, while the battery swap area selection model only considers the service utilization rate of the battery-swap stations in the state transition, in order to make the two learning models proceed in a certain direction as the same as possible, the probability weight distribution of the two factors has been considered in a state transition function of the battery swap area division, then the system will only give rewards in terms of the service utilization.

In the battery swap area selection system, each time a strategy is formulated, the reward function based on the service utilization and the service quality is obtained, the task of the battery swap areas is to receive more service reservations so as to provide more services, so that the utilization rate between the battery-swap stations is balanced on the basis of improving the service quality of the battery swap scheduling strategy, and the service utilization rate of the battery-swap stations is further improved when there are more battery swap requests. The reward function is designed according to a deviation between a current service rate and an optimal service rate.

4) Design of the Battery Swap Area Division

An overall idea of the area division strategy is that: in the dynamic battery swap area system, a distance between an overall division value and an ideal division value under a scene is examined, in which this value includes two aspects, namely the service quality and the service rate, and in order to ensure sufficient batteries supply, it is necessary to control arrival of vehicles and re-plan for the swap stations in all areas. The main point is to treat multiple battery-swap stations as agents that influence each other, then conducting multi-agent synchronization planning. Regarding an actual number of trips to the battery swap areas in a time cycle, that is, the service rate, by examining the distance between the current service rate and the optimal number of services of all battery swap areas, the performance of the division strategy can be evaluated.

When there are multiple battery-swap stations in the scene, by dividing these battery-swap stations into several battery swap areas, the areas can be divided into multiple action spaces. Each battery swap area with a suitable distance is split and reorganized. In order to be consistent with the distance setting of the battery swap scheduling strategy, an appropriate distance is defined as the same as the distance which the electric vehicles look for the battery swap areas in the battery swap scheduling strategy. As shown in FIG. 4, the area 1 satisfies the area splitting conditions, in the short-distance swap areas 2, 3, 4, 5, 6 and 7, according to the value of the area division, it finds an object battery swap area 3 for the joint implementation of the area division strategy. The area division strategy is formulated in the following way:

Since any electric vehicle considers a load situation of each area when implementing the battery swap strategy, there is little probability to choose a battery swap station with a high service rate, which might cause the service rate of a certain swap area to be too high. With such a fact that a reward mechanism always gives a positive rewards accumulation, these swap stations in the battery swap areas with a high, service rate at a certain moment will appear "no one cares" for a period of time in the future. In order to alleviate this phenomenon, in the division of battery swap areas, the system strives to increase the service rate of battery-swap stations as much as possible, so that only when the service rate is higher than a certain limit, it will give greater opportunities for a split and reorganization of the battery swap areas.

The area division action is executed according to the action with a maximum value. With a rewarded iteration, it updates the reward equation through a current judgment to "retrospect" the best action that "should" be performed in the past. The value of each area for the division of areas is updated to correspond to the value of each swap station, then the value of each swap station represents the comprehensive performance of the certain battery-swap station in different battery swap areas, so that any battery-swap station with a good comprehensive performance is more suitable for participating in the area division.

Since only those swap stations that are close to the concerned battery-swap area are selected, the area division according to the present invention does not use an arrival time of vehicles as the basis for division, in order that (1) each battery swap area has a relatively fixed geographic location; (2) not allowing the far away swap stations to be divided into the same swap area, it greatly reduces the number of swap stations in a synchronously updated area, so that the present invention makes the following provisions:

A value matrix of the swap stations is used to form a state judgment matrix. Since the diagonal elements always reside for the battery swap areas, and their value updating is synchronized with the updated value of the current battery swap areas, so the states of the diagonal elements may not be considered in the judgment. The state space can be redefined, and the new judgment matrix and the value matrix of battery swap areas can be used to determine whether the battery swap areas need to be reorganized and split.

According to the reward function, if a certain battery swap area needs more electric vehicles to come to exchange their batteries in a current cycle, a greater service rate is required; however, if the battery-swap stations other than the diagonal elements cannot provide the greater service rate, from the perspective view of the average utilization rate of an entire scene, although the swap strategy considers the service quality factors including waiting time, there must be a long queue phenomenon in the rest of the swap areas; and although the swap area system encourages such a policy, from the perspective view of retrospective optimal rewards, this battery swap area cannot have the greater service rate, so the division of such areas is not successful; on the contrary, if the battery-swap stations can provide more service rate for the battery swap areas, the strategy is successful.

If the current service rate is very high, because the area division algorithm encourages a higher service rate, the system reaches a good state at this time. In order to prevent the service rate from being too high, a cut-off function is set, so as to control its peak value, and an appropriate area division strategy is selected for it.

If a threshold is larger, the system encourages a certain area to get a higher service rate, and the system focuses on attracting more electric vehicles to come to the area to exchange their batteries, and then it increases the service rate of swap stations, and vice versa.

When the electric vehicles need a greater service rate but the swap stations cannot provide it, the swap areas are split and reorganized. The swap stations are reorganized according to a probability transfer function, an action is executed according to the corresponding probability, and then the system obtains a new state. After the action is executed, it is judged whether the action is the best through a retrospective method. If it is the best, the value function is updated in a traditional way.

Figure 1:
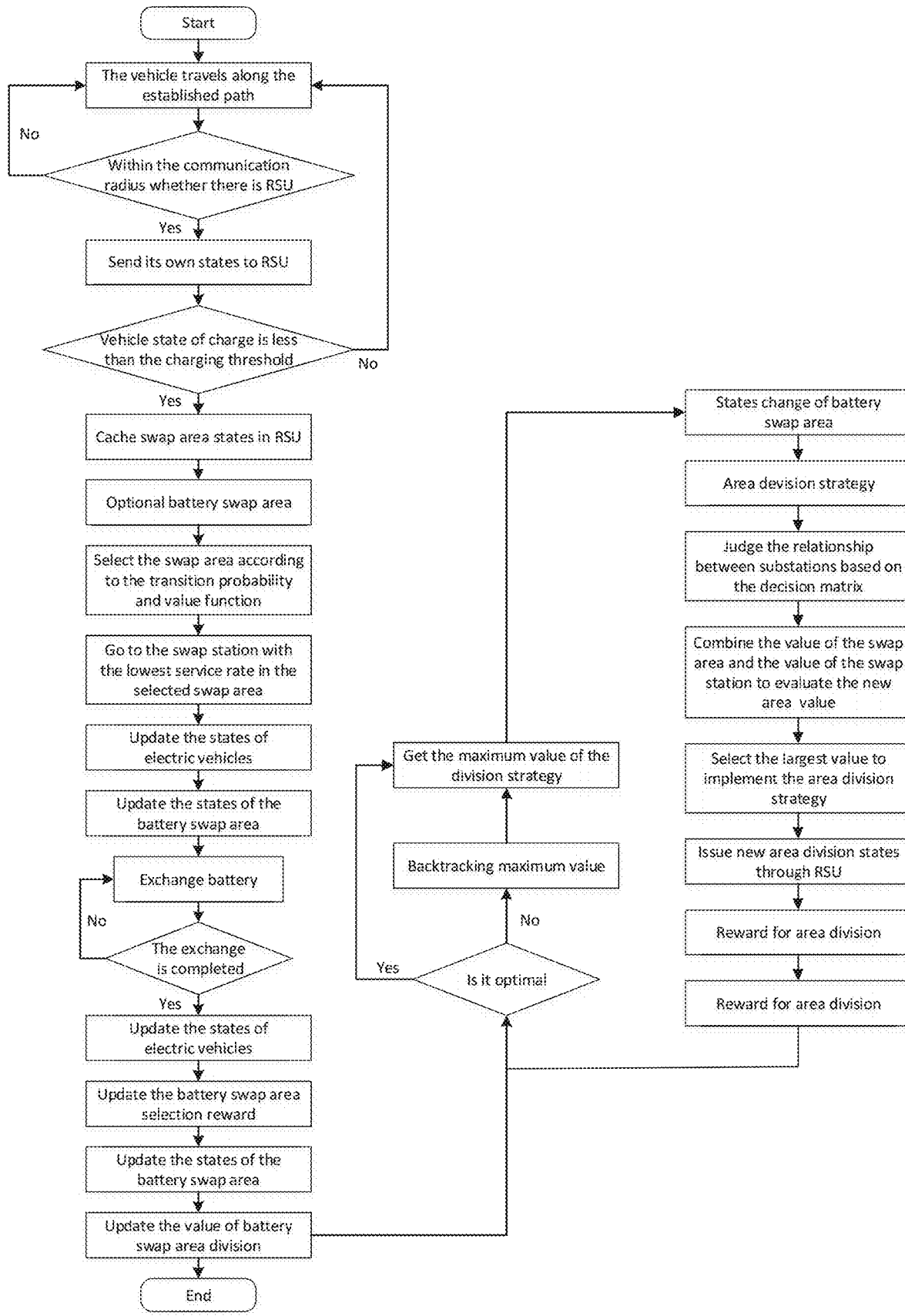
FIG. 1 is a schematic view of a decision-making system for electric vehicle battery-swap stations in the Internet of Vehicles according to the present invention.

An overall work flow of the battery swap scheduling strategy system according to the present invention is shown in FIG. 1.

In a simulation scenario of the Helsinki map, the scheduling strategy of the present invention reduces an average waiting time by more than 20% compared with commonly used scheduling algorithms such as MD (Markovian Dynamics) and MTD (Max Travelling Distance), and a total amount of battery swaps is also significantly improved. Especially, when the number of electric vehicles is large enough, and more electric vehicles need to wait for exchanging their batteries, the advantage is more obvious.

Due to the characteristics of an offline teaming, the reinforcement learning algorithm inevitably causes some very undesirable results in an experience accumulation stage. Fortunately, the value update method that can trace the maximum value used in the present invention corrects the negative impact of bad results to a large extent on the learning system. It is suitable for the battery swap scheduling of electric vehicles.

The invention claimed is:

1. A method for scheduling an electric vehicle (EV) battery swap based on an Internet of Vehicles (IoV), wherein
   a plurality of edge information transceiver devices and a plurality of information processing devices are deployed on roadside units (RSU), a processing bad of an intelligent transportation system is distributed to edge processing nodes, and a vehicle infrastructure cooperative communication is carried out through the VANET; each roadside unit connected through an optical fiber network acts as a relay node to exchange information with mobile clients of the electric vehicles; an information sharing is maintained among relay agents; and when a mobile client leaves a communication radius of one relay node, it searches for another relay node to continue an information transmission task;
   a V2R service is deployed on a MEC platform; the RSU and an on-board unit (OBU) use their own MCUs to make battery swap decisions and information processing, respectively, and communicate through a signal transceiver device processed by a DSRC protocol; according to a map surrounding the electric vehicles that require battery swap services, the roadside units combine a battery-swap station cluster with a high degree of potential cooperation as a whole, gather them into a single battery swap area, and obtain a probability distribution of every swap area's service capacity, so that the swap area with the highest service capacity probability is introduced to multiple electric vehicles with a swap service requirement at the same time;
   a service rate of a cluster of swap stations is taken as an assessment target, mainly examining a service capability, a service quality, and location information of each of swap station nodes themselves, and a current state of those electric vehicles that require to swap battery; and
   a solution of the best joint actions is provided for the overall electric vehicles to maintain the overall service balance of every swap station and improve a long-term performance of the Internet of Vehicles.

2. The method according to claim 1, wherein the electric vehicles with the same position change at the same time are processed as the same agent to reduce a number of dimensions.

3. The method according to claim 1, wherein said method comprises implementing the Reinforcement Learning (RL) and continuously updating a probability distribution information of the electric vehicles which needs the expected service.

4. The method according to claim 1, wherein the roadside units are active to divide the electric vehicles into different battery-swap areas dynamically.

5. The method according to claim 1, wherein a division of the battery-swap areas is dynamically adjusted according to a cooperation fit of the swap areas, the current service state, and a strategic allocation difference among the battery-swap areas.

6. The method according to claim 1, wherein every time the battery-swap areas are divided, a long-term reward of the decision is estimated, and an after-the-fact evaluation of each time for executing the EVs' actual action is made.

7. The method according to claim 1, wherein other than paying attention to individual swap station, the method cares about a deviation of the service rate and service quality of a swap area as a whole from an ideal service rate and service quality, in which the service rate of a cluster of the swap stations is obtained by feedback, and it is used as a parameter to re-divide the swap areas.

8. The method according to claim 1, wherein according to a parameter amplitude, a parameter change rate, and a current service capacity of each swap area in the scene; and/or, according to a current state and long-term reward, the roadside units select a suitable battery swap area for a concerned EV; and the result of the battery swap service is fed back to the roadside units.

9. The method according to claim 1, wherein during dividing the battery-swap areas, only those swap stations that are close to a concerned battery-swap area are selected, and the multiple swap stations are synchronously re-split and reorganized according to a decision matrix.

10. The method according to claim 1, wherein the roadside units are provided with a quantitative reward means for self-evaluating their decision accuracy; after the swap areas are divided or after any EV is changed its battery at a swap station, an actual status is fed back to the roadside units, and a difference from its ideal expectation is obtained; if the difference is small, it indicates that the decision making is accurate, and the same decision is made as an experience in the future, thereby recording the highest reward value; if the difference is large, it indicates that the decision making is inaccurate, and the same decision is not made in the future, thereby recording the lowest reward value; a set of big data comprising the reward values is used as a part of the roadside units' reinforcement learning results, so as to provide a basis for making subsequent decisions on the same or similar events.

* * * * *